(12) United States Patent
Hsieh

(10) Patent No.: US 10,933,518 B2
(45) Date of Patent: Mar. 2, 2021

(54) JOINTING STRUCTURE MORE TIGHTLY ENGAGED WITH A FORCING TOOL THROUGH ABUTTING MEMBERS

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 0 days.

(21) Appl. No.: 16/676,457

(22) Filed: Nov. 7, 2019

(65) Prior Publication Data
US 2020/0147769 A1 May 14, 2020

(30) Foreign Application Priority Data
Nov. 9, 2018 (TW) ................... 107139945

(51) Int. Cl.
*B25B 23/14* (2006.01)
*B25B 23/00* (2006.01)
*B25B 23/142* (2006.01)
*G01L 3/04* (2006.01)
*F16D 7/04* (2006.01)

(52) U.S. Cl.
CPC ........ *B25B 23/141* (2013.01); *B25B 23/0007* (2013.01); *B25B 23/1427* (2013.01); *G01L 3/04* (2013.01); *F16D 7/04* (2013.01)

(58) Field of Classification Search
CPC . B23K 20/122; F16L 19/0218; B25B 23/141; B25B 23/0007; B25B 23/1427; G01L 3/04; F16D 7/04
USPC .................................... 73/862.191
See application file for complete search history.

(56) References Cited

U.S. PATENT DOCUMENTS

| 6,533,669 | B2* | 3/2003 | Knodle ............... F16D 3/227 464/146 |
| 6,575,047 | B2* | 6/2003 | Reik ................. F16H 55/56 73/862.191 |
| 6,951,462 | B2* | 10/2005 | Kumar ............ A61C 8/0089 433/127 |
| 7,832,285 | B2* | 11/2010 | Hsieh ............... G01L 25/003 73/862.21 |
| 2017/0282337 | A1* | 10/2017 | Johnson ........... B25B 15/008 |
| 2020/0061779 | A1* | 2/2020 | Gunther ........... B25B 13/462 |

* cited by examiner

*Primary Examiner* — Octavia Hollington
(74) *Attorney, Agent, or Firm* — CKC & Partners Co., LLC

(57) ABSTRACT

A jointing structure includes a jointing member and at least two abutting members. The at least two abutting members are disposed on the jointing member. The jointing member includes a surface and a plurality of side surfaces surrounding the surface, and the at least two abutting members are disposed on at least two of the side surfaces respectively.

8 Claims, 7 Drawing Sheets

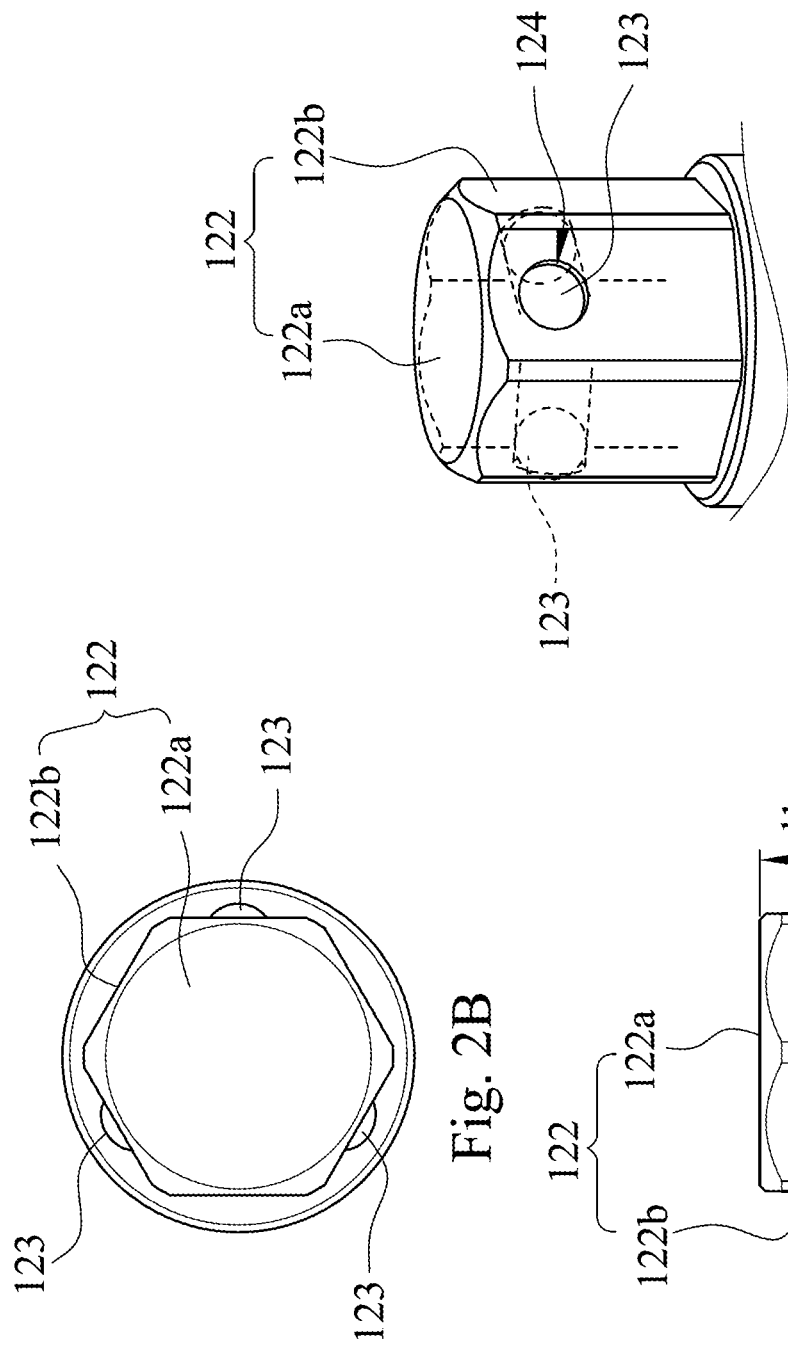

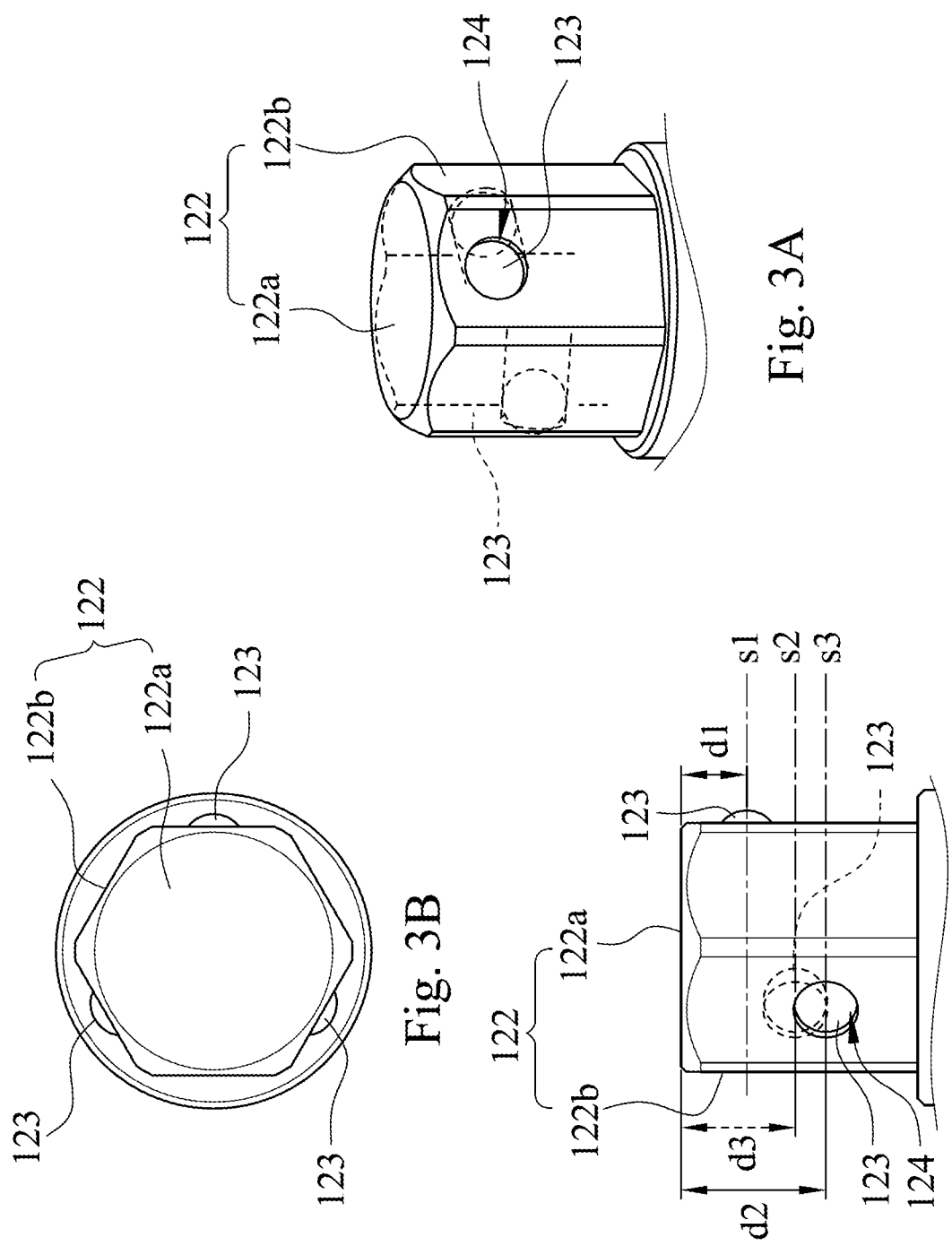

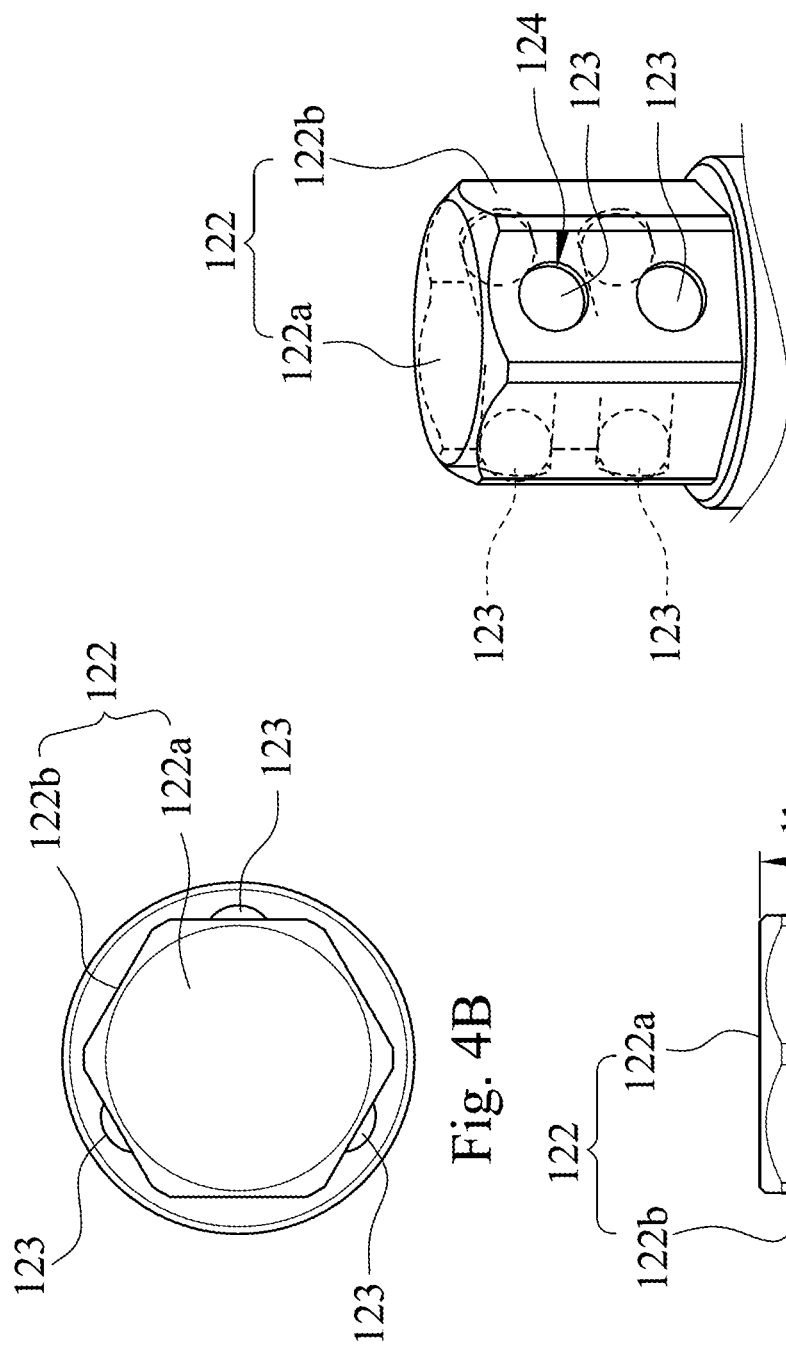

JOINTING STRUCTURE MORE TIGHTLY ENGAGED WITH A FORCING TOOL THROUGH ABUTTING MEMBERS

RELATED APPLICATIONS

This application claims priority to Taiwan Application Serial Number 107139945, filed Nov. 9, 2018, which is herein incorporated by reference.

BACKGROUND

Technical Field

The present disclosure relates to a jointing structure. More particularly, the present disclosure relates to a jointing structure which can be more tightly engaged with a forcing tool through abutting members.

Description of Related Art

Nowadays, variety of forcing tools such as wrenches or screwdrivers have been commonly used to provide fixing of the fastener (such as screws, bolts or nuts). Further, in the field of aeromechanic or more precise mechanical equipment, the user must accurately control the torque value to properly lock the fasteners such as screws or bolts. Therefore, the aforementioned forcing tools should be regularly measured the torque and calibrated.

The aforementioned forcing tools need to tightly couple to the fastener or the torque measuring device for locking the fastener or the torque measuring device to provide the effective force and the accurate torque value. In general, the aforementioned forcing tools are coupled to the adapter socket or the jointing structure disposed on the torque measuring device. However, the current jointing structure do not have a consideration for the tightness of the joint, so that the aforementioned forcing tools cannot be tightly engaged with the fastener or the torque measuring device, and the effect of the force is poor or the accurate torque value cannot be measured.

Therefore, there is still needed to develop a jointing structure which can be tightly engaged with the various forcing tools and the torque measuring device.

SUMMARY

According to one embodiment of the present disclosure, a jointing structure includes a jointing member and at least two abutting members. The at least two abutting members are disposed on the jointing member. The jointing member includes a surface and a plurality of side surfaces surrounding the surface, and the at least two abutting members are disposed on at least two of the side surfaces respectively.

BRIEF DESCRIPTION OF THE DRAWINGS

The present disclosure can be more fully understood by reading the following detailed description of the embodiment, with reference made to the accompanying drawings as follows:

FIG. 2A is a schematic view of abutting members of a jointing structure according to another embodiment of the present disclosure.

FIG. 2B is another schematic view of the jointing structure of FIG. 2A.

FIG. 2C is another schematic view of the jointing structure of FIG. 2A.

FIG. 3A is a schematic view of abutting members of a jointing structure according to another embodiment of the present disclosure.

FIG. 3B is another schematic view of the jointing structure of FIG. 3A.

FIG. 3C is another schematic view of the jointing structure of FIG. 3A.

FIG. 4A is a schematic view of abutting members of a jointing structure according to another embodiment of the present disclosure.

FIG. 4B is another schematic view of the jointing structure of FIG. 4A.

FIG. 4C is another schematic view of the jointing structure of FIG. 4A.

DETAILED DESCRIPTION

Figure 1:
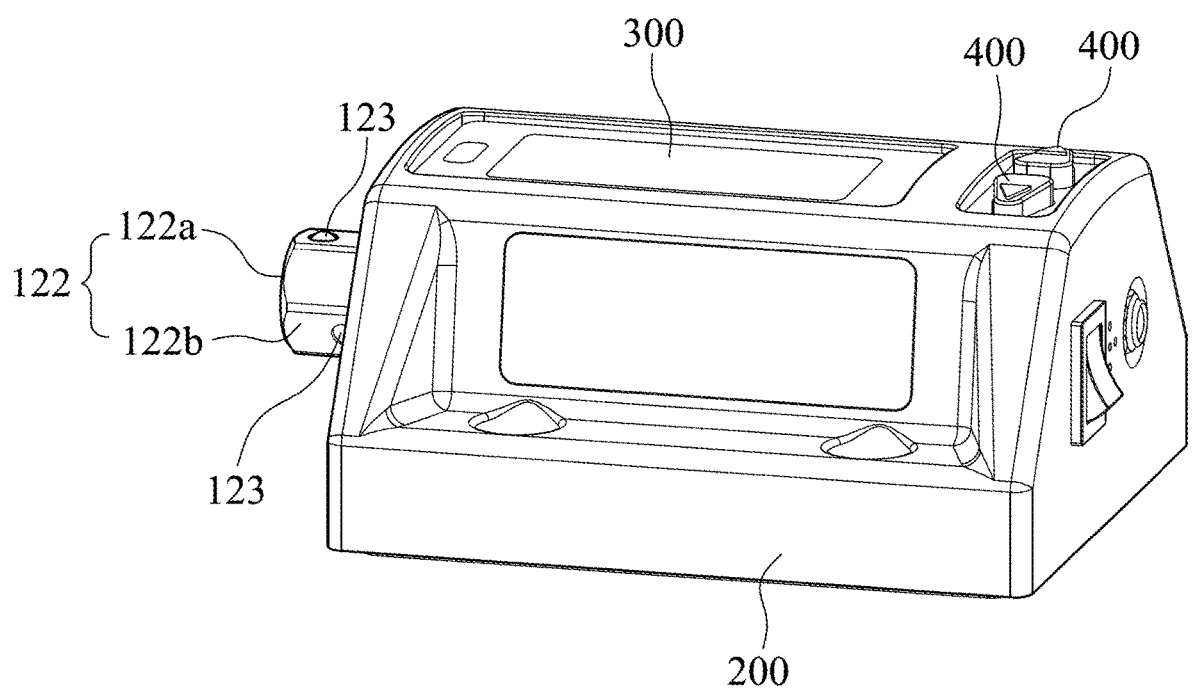
FIG. 1 is a three-dimensional view of a torque measuring device equipped with a jointing structure according to one embodiment of the present disclosure.

FIG. 1 is a three-dimensional view of a torque measuring device 100 equipped with a jointing structure according to one embodiment of the present disclosure.

The torque measuring device 100 includes a housing 200. The jointing structure is disposed on the housing 200 and includes a jointing member 122 and at least two abutting members 123. The jointing member 122 includes a surface 122a and a plurality of side surfaces 122b surrounding the surface 122a. Each of the abutting members 123 is disposed on at least two of the side surfaces 122b.

Therefore, the jointing member 122 can be engaged with a forcing tool by each abutting member 123. At this time, the torque value of the forcing tool can be measured by the torque measuring device 100. The forcing tool can be a ratchet wrench, a torque wrench, a pneumatic tool, a screwdriver or a socket, and will not be limited thereto. For example, the torque wrench is engaged with the jointing member 122. For example, when the torque value of a torque wrench is measured (or calibrated), the torque wrench should be engaged with jointing member 122 firstly, such as, the torque wrench can be sleeved on the jointing member 122 via a socket. An inner surface of the socket sleeved on the jointing member 122 can be abutted and fixed by the abutting members 123 of the jointing member 122, so that the torque wrench can be stably engaged with the jointing member 122. Therefore, the transmission of the torque is more accurate so as to obtain more accurate result of the torque measurement (or calibration).

Moreover, the torque measuring device 100 can further include a displaying screen 300 and a plurality of controlling buttons 400. The displaying screen 300 is disposed on the housing 200 and is for displaying the torque value. The controlling buttons 400 are disposed on the housing 200 and for selecting a torque sensing direction.

In order to match the various forcing tools, the surface 122a of the jointing member 122 can be surrounded by the side surfaces 122b and be various geometric shapes, such as a quadrilateral, a hexagon, an octagon, a dodecagon or a polygon, etc., but will not limited thereto. For example, when the surface 122a of the jointing member 122 is quadrilateral, that is, the surface 122a is surrounded by four side surfaces 122b, and the jointing member 122 can be cooperated with a square socket.

In order to obtain a good and stable abutting effect, the number of the abutting members 123 can be at least two. Moreover, the at least two abutting members 123 are disposed on the at least two side surfaces 122b respectively. The arranging positions of the abutting members 123 are also different depending on various using conditions. For example, each of the abutting members 123 is symmetrically disposed on each of the side surfaces 122b, and distances between a position of each of the abutting members 123 on the each of the side surfaces 122b and the surface 122a are different. The following paragraphs illustrate the different shapes of the surface 122a of the jointing member 122 and the different positions of the abutting members 123 in several embodiments.

FIG. 2A is a schematic view of abutting members 123 of a jointing structure according to another embodiment of the present disclosure. FIG. 2B is another schematic view of the jointing structure of FIG. 2A. FIG. 2C is another schematic view of the jointing structure of FIG. 2A. In FIGS. 2A, 2B and 2C, the surface 122a of the jointing member 122 is a hexagon, that is, the jointing member 122 includes six side surfaces 122b. The number of the abutting members 123 is three. The abutting members 123 are symmetrically disposed on the side surfaces 122b respectively. The distances d1 between each of the abutting members 123 and the surface 122a are the same. The abutting members 123 can be a sphere but is not limited thereto. Each of the three side surfaces 122b, which are the abutting members 123 disposed thereon, includes an embedding slot 124. Each abutting member 123 is telescopically embedded in the embedding slot 124. Therefore, when the forcing tool is sleeved on the jointing member 122 via a hexagonal socket, the abutting members 123 can be telescopically moved from the embedding slots 124 so as to abut the inner surface of the hexagonal socket. Hence, the forcing tool can be firmly engaged with the jointing member 122, so that the torque can be accurately transmitted by the forcing tool, and the torque value can be measured more accurately.

FIG. 3A is a schematic view of abutting members 123 of a jointing structure according to another embodiment of the present disclosure. FIG. 3B is another schematic view of the jointing structure of FIG. 3A. FIG. 3C is another schematic view of the jointing structure of FIG. 3A. In FIGS. 3A, 3B and 3C, the surface 122a of the jointing member 122 is a hexagon, that is, the jointing member 122 includes six side surfaces 122b. The number of the abutting members 123 is three. The abutting members 123 are symmetrically disposed on the side surfaces 122b respectively. The difference from the embodiment of FIGS. 2A-2C is that the distances between each of the abutting members 123 and the surface 122a are different. Therefore, the different effect of abutment and stability can be obtained. For example, in FIG. 3C, the three abutting members 123 are spaced apart from the surface 122a by a distance d1, a distance d2 and a distance d3 respectively. The distance d1, the distance d2 and the distance d3 are different. Moreover, the three abutting members 123 are located on three different cross sections s1, s2 and s3 of the jointing member 122.

FIG. 4A is a schematic view of abutting members 123 of a jointing structure according to another embodiment of the present disclosure. FIG. 4B is another schematic view of the jointing structure of FIG. 4A. FIG. 4C is another schematic view of the jointing structure of FIG. 4A. The difference of the embodiment of FIGS. 4A, 4B and 4C and the embodiment of FIG. 2A and the embodiment of FIG. 3A is that the number of the abutting members 123 is different. Two of the abutting members 123 are disposed on each of the side surfaces 122b. The distances d1 between each abutting members 123 disposed on different side surfaces 122b and the surface 122a are the same. Therefore, the different effect of abutting and fixing according to different situation can be obtained.

Figure 5A:
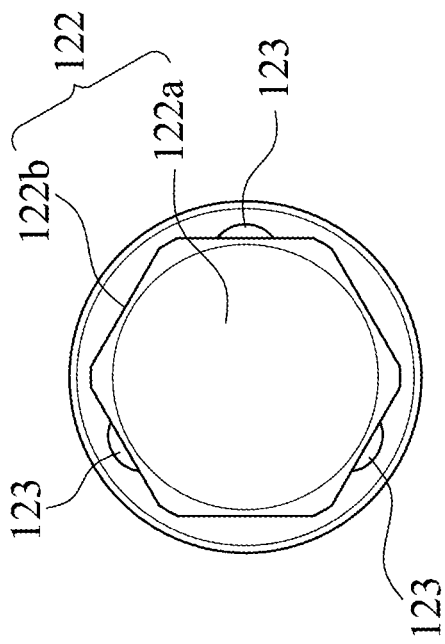
FIG. 5A is a schematic view of a surface of a jointing member being a quadrilateral according to another embodiment of the present disclosure.
Figure 5B:
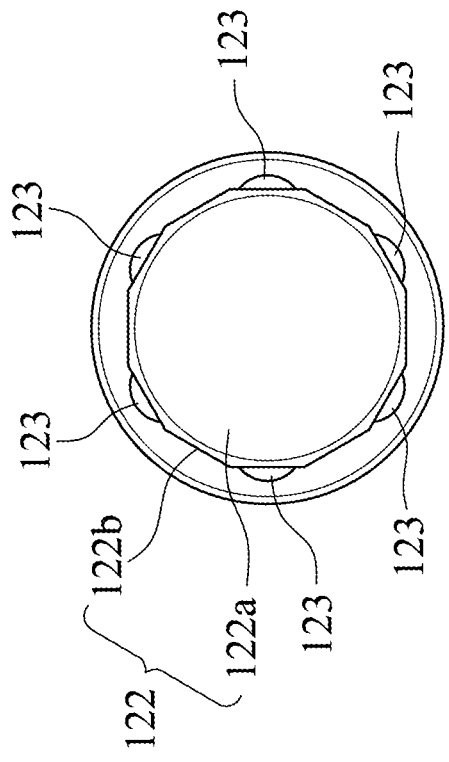
FIG. 5B is a schematic view of a surface of a jointing member being a hexagon according to another embodiment of the present disclosure.
Figure 5C:
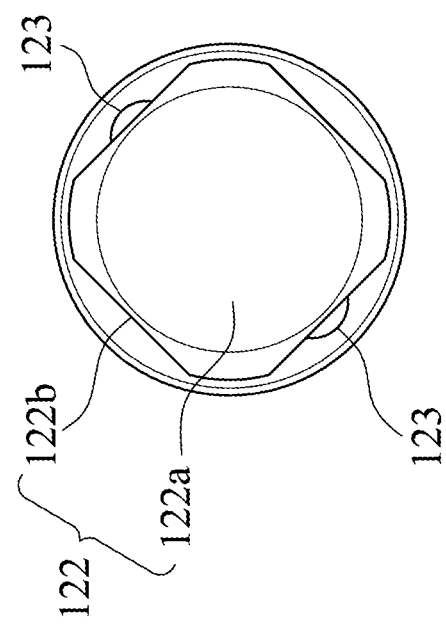
FIG. 5C is a schematic view of a surface of a jointing member being an octagon according to another embodiment of the present disclosure.
Figure 5D:
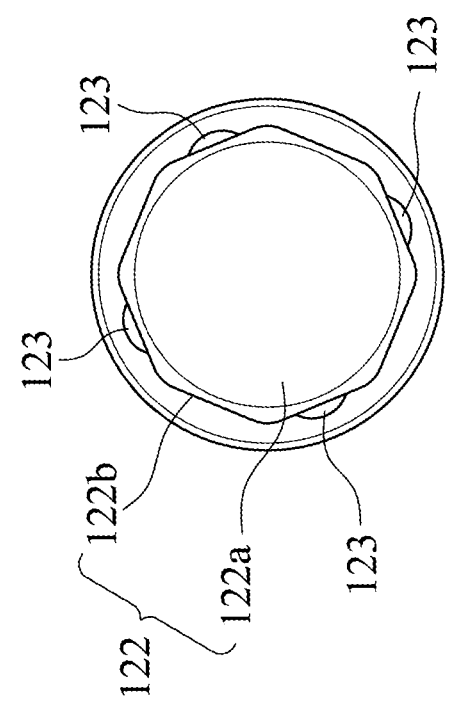
FIG. 5D is a schematic view of a surface of a jointing member being a dodecagon according to another embodiment of the present disclosure.

FIG. 5A is a schematic view of a surface 122a of a jointing member 122 being a quadrilateral according to another embodiment of the present disclosure. FIG. 5B is a schematic view of a surface 122a of a jointing member 122 being a hexagon according to another embodiment of the present disclosure. FIG. 5C is a schematic view of a surface 122a of a jointing member 122 being an octagon according to another embodiment of the present disclosure. FIG. 5D is a schematic view of a surface 122a of a jointing member 122 being a dodecagon according to another embodiment of the present disclosure. The surface 122a of the jointing member 122 can be various geometric shapes to match different forcing tool. Moreover, depending on the different amount and arranging positions of the abutting members 123 can obtain the different effect of abutting. In FIG. 5A, the surface 122a of the jointing member 122 is quadrilateral (that is, the jointing member 122 includes four side surfaces 122b), and the number of the abutting members 123 is two. In FIG. 5B, the surface 122a of the jointing member 122 is hexagonal (that is, the jointing member 122 includes six side surfaces 122b), and the number of the abutting members 123 is three. In FIG. 5C, the surface 122a of the jointing member 122 is octagonal (that is, the jointing member 122 includes eight side surfaces 122b), and the number of the abutting members 123 is four. In FIG. 5D, the surface 122a of the jointing member 122 is dodecagonal (that is, the jointing member 122 includes twelve side surfaces 122b), and the number of the abutting members 123 is six.

Figure 6:
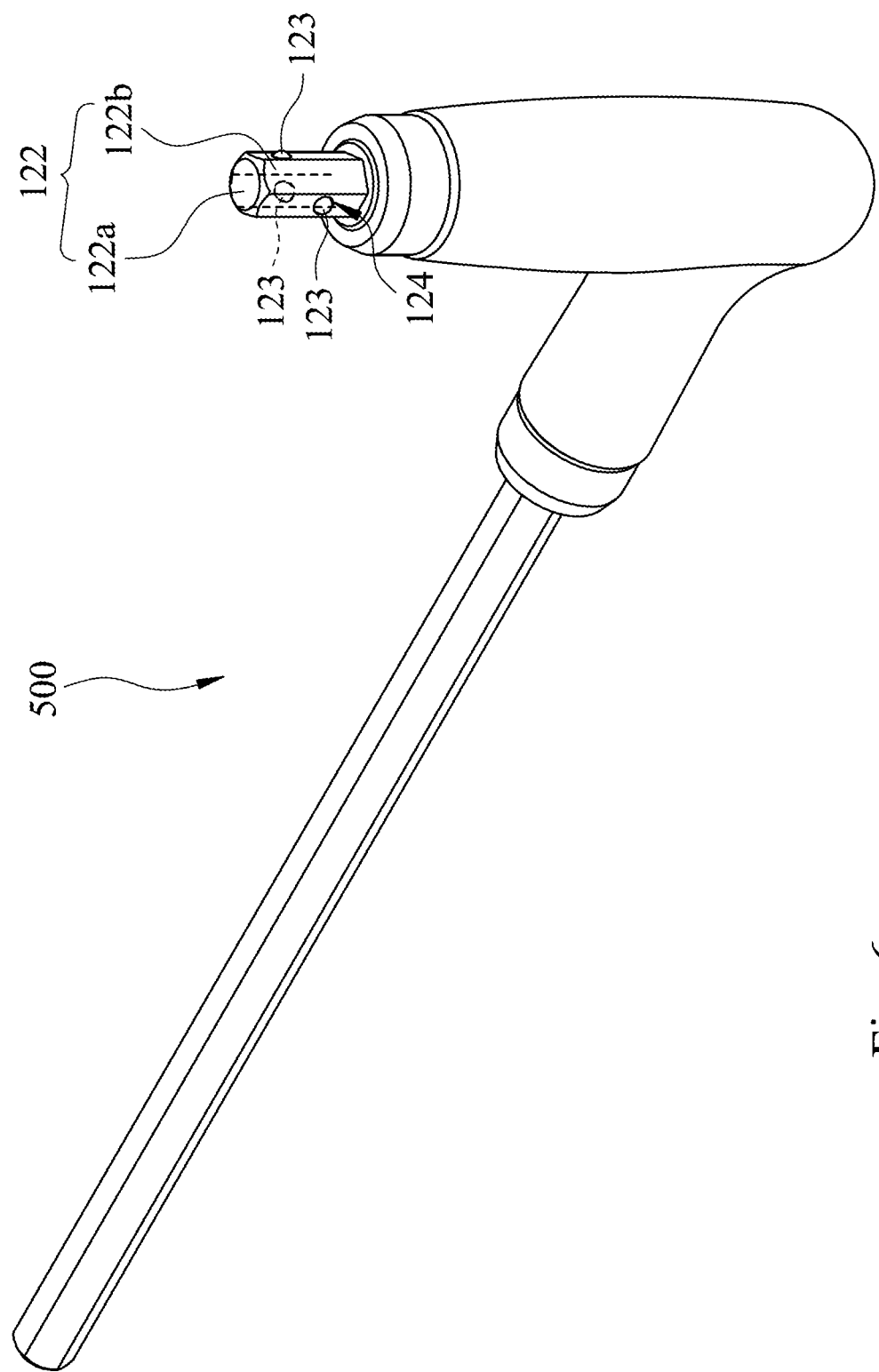
FIG. 6 is a schematic view of a forcing tool equipped with a jointing structure according to one embodiment of the present disclosure.

FIG. 6 is a schematic view of a forcing tool equipped with a jointing structure according to one embodiment of the present disclosure. Shown as FIG. 6, the jointing structure can be disposed on the torque measuring device 100 of the aforementioned embodiment, and it can also be disposed on the forcing tool 500. The forcing tool 500 can be a ratchet wrench, a torque wrench, a palm wrench, a pneumatic tool, a screwdriver or a socket. In FIG. 6, when the torque value of the forcing tool 500 is measured or calibrated, the jointing member 122 of the jointing structure is disposed on an end of the forcing tool 500, and the forcing tool 500 is connected to a socket by the jointing member 122 so as to connect to the torque measuring device 100 of FIG. 1. Therefore, the effect of a stable and accurate measurement of the torque value can be achieved by the abutting members 123. The geometrical configuration of the abutting members 123 has been described in the aforementioned embodiment, and will not be described herein again. In other embodiment, the forcing tool 500 can also be connected to an adapter (such as a socket) by the exposed jointing member 122 so as to lock a fastener. At this time, the force can be evenly provided by the different geometric configurations of the abutting members 123 and so as to obtain a more stable locking effect.

Figure 7:
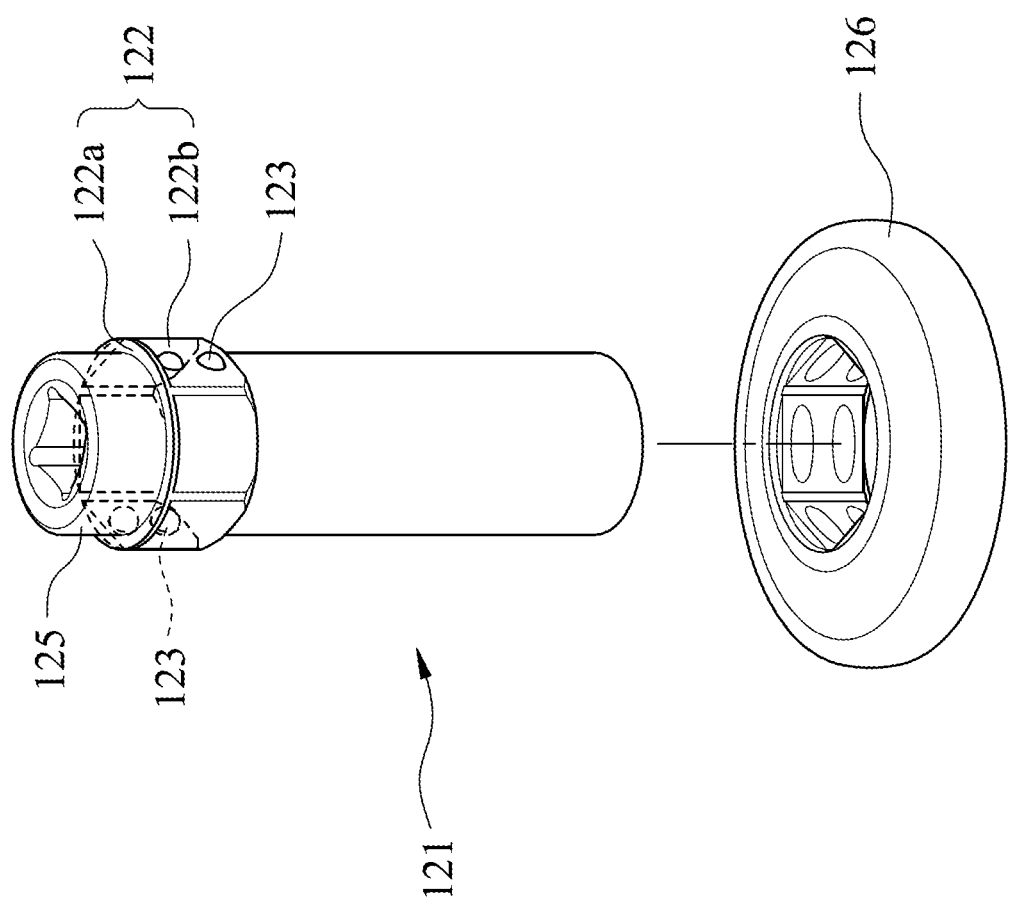
FIG. 7 is a schematic view of another forcing tool equipped with a jointing structure according to one embodiment of the present disclosure.

FIG. 7 is a schematic view of another forcing tool equipped with a jointing structure according to one embodiment of the present disclosure. The jointing structure of present disclosure can be used with various forcing tools. In FIG. 7, the two side surfaces 122b of the jointing member 122 of the jointing structure are symmetrically disposed on two abutting members 123. The jointing member 122 is integrally extended in a vertical direction of the surface 122a to provide a sleeve 125 for sleeving different fasteners. At the same time, a ring 126 is sleeved on a rod 121 connected to the jointing member 122. The ring 126 tightly engaged with the side surfaces 122b of the jointing member 122 via the abutting members 123, and so as to form a palm socket.

In conclusion, different stabilization effects of the forcing tools can be provided by the various number and the arranging positions of the abutting members 123, and so as to be in response to various situations.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A jointing structure, comprising:
    a jointing member; and
    at least two abutting members disposed on the jointing member;
    wherein the jointing member comprises a surface and a plurality of side surfaces surrounding the surface, the at least two abutting members are disposed on at least two of the side surfaces respectively, each of the abutting members is disposed on each of the at least two of the side surfaces, and distances between a position of each of the abutting members on each of the at least two of the side surfaces and the surface are different.

2. The jointing structure of claim 1, wherein each of the at least two side surfaces comprises an embedding slot, and each of the abutting members is telescopically embedded in the embedding slot.

3. The jointing structure of claim 1, wherein the surface is polygonal.

4. The jointing structure of claim 1, wherein each of the abutting members is symmetrically disposed on each of the at least two of the side surfaces.

5. The jointing structure of claim 1, wherein the jointing member is disposed on a forcing tool or a torque measuring device.

6. The jointing structure of claim 5, wherein the forcing tool is a ratchet wrench, a torque wrench, a palm wrench, a pneumatic tool, a screwdriver or a socket.

7. The jointing structure of claim 5, wherein the torque measuring device comprises a housing, the jointing member is disposed on the housing.

8. The jointing structure of claim 7, wherein the torque measuring device further comprises:
    a displaying screen disposed on the housing and for displaying a torque value; and
    a plurality of controlling buttons disposed on the housing and for selecting a torque sensing direction.

* * * * *